United States Patent
Österlund

(10) Patent No.: US 9,191,498 B2
(45) Date of Patent: Nov. 17, 2015

(54) METHOD AND APPARATUS FOR HANDLING ANONYMOUS CALLS

(75) Inventor: Håkan Österlund, Ekero (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 19 days.

(21) Appl. No.: 13/643,740

(22) PCT Filed: Apr. 29, 2010

(86) PCT No.: PCT/SE2010/050473
§ 371 (c)(1),
(2), (4) Date: Dec. 17, 2012

(87) PCT Pub. No.: WO2011/136708
PCT Pub. Date: Nov. 3, 2011

(65) Prior Publication Data
US 2013/0094643 A1 Apr. 18, 2013

(51) Int. Cl.
*H04M 3/42* (2006.01)
*H04L 12/66* (2006.01)

(52) U.S. Cl.
CPC ............ *H04M 3/42* (2013.01); *H04M 3/42008* (2013.01)

(58) Field of Classification Search
CPC ... H04M 3/42042; H04M 3/436; H04M 1/57; H04M 3/42059; H04M 1/575; H04M 2250/60; H04M 1/56; H04M 3/42008; H04M 3/42068; H04M 1/72563; H04L 63/0421; H04L 63/0407; H04L 61/2539; H04L 12/585; H04L 51/12
USPC ........ 379/88.19, 88.2, 88.21, 142.01, 142.02, 379/142.06, 201.11, 207.14, 207.15, 379/210.02, 210.03, 221; 370/352, 353, 370/354, 355, 356, 357
See application file for complete search history.

(56) References Cited

U.S. PATENT DOCUMENTS 5,623,536 A * 4/1997 Solomon et al. ............ 379/88.18
5,818,836 A * 10/1998 DuVal .......................... 370/389
(Continued)

FOREIGN PATENT DOCUMENTS

WO         9842115 A1    9/1998
WO    WO 2009021332 A1 *  2/2009

OTHER PUBLICATIONS

Webster's New World Dictionary, 1988, Third College Edition, Simon & Schuster, p. 56.*
(Continued)

*Primary Examiner* — Quynh Nguyen
*Assistant Examiner* — Kharye Pope
(74) *Attorney, Agent, or Firm* — Rothwell, Figg, Ernst & Manbeck, P.C.

(57) ABSTRACT

A method and apparatus at an apparatus for handling an incoming call (2:7, 3:7, 4:7) originating from an anonymous calling party(100) where the anonymous calling party calling party(100) can be identified on the basis of a personal identity assigned to the anonymous calling party(100), wherein the personal identity is assignable to the anonymous calling party (100) after a personal identity has been assigned to the anonymous calling party in response to a manually or automatically initiated assignment instruction, but without requiring any interaction from the anonymous calling party(100). The suggested method and apparatus are applicable in any type of wireless or fixed communications network which enables a calling party to register as an anonymous calling party.

17 Claims, 6 Drawing Sheets

(56) References Cited

U.S. PATENT DOCUMENTS

| | | | |
|---|---|---|---|
| 5,940,484 A * | 8/1999 | DeFazio et al. | 379/142.06 |
| 6,148,067 A * | 11/2000 | Leipow | 379/201.01 |
| 6,603,845 B2 * | 8/2003 | Jensen et al. | 379/142.01 |
| 6,665,389 B1 * | 12/2003 | Haste, III | 379/196 |
| 6,680,935 B1 * | 1/2004 | Kung et al. | 370/352 |
| 6,738,462 B1 * | 5/2004 | Brunson | 379/142.06 |
| 6,952,468 B2 * | 10/2005 | Lee | 379/142.12 |
| 7,103,163 B1 * | 9/2006 | Cook | 379/142.06 |
| 7,231,030 B2 * | 6/2007 | Jones | 379/210.02 |
| 7,352,855 B2 * | 4/2008 | Bedingfield, Sr. | 379/210.03 |
| 8,432,897 B2 * | 4/2013 | Bangor et al. | 370/352 |
| 8,855,274 B2 * | 10/2014 | Barnes et al. | 379/88.18 |
| 2002/0027901 A1 * | 3/2002 | Liu et al. | 370/352 |
| 2003/0133553 A1 * | 7/2003 | Khakoo et al. | 379/142.01 |
| 2003/0147519 A1 | 8/2003 | Jain et al. | |
| 2004/0096046 A1 * | 5/2004 | Lection et al. | 379/142.06 |
| 2005/0058266 A1 * | 3/2005 | Krause | 379/142.06 |
| 2005/0141487 A1 * | 6/2005 | Mansfield | 370/352 |
| 2006/0199572 A1 * | 9/2006 | Chin et al. | 455/415 |
| 2007/0165809 A1 * | 7/2007 | Nemoto et al. | 379/142.06 |
| 2007/0248220 A1 * | 10/2007 | Crandell et al. | 379/142.05 |
| 2008/0112553 A1 * | 5/2008 | Chen et al. | 379/142.06 |
| 2008/0219424 A1 * | 9/2008 | Moss et al. | 379/142.05 |
| 2009/0052644 A1 * | 2/2009 | Wood et al. | 379/142.06 |

OTHER PUBLICATIONS

Office Action dated Sep. 3, 2014, issued in Chinese Patent Application No. 201080066502.4, 7 pages.

* cited by examiner

METHOD AND APPARATUS FOR HANDLING ANONYMOUS CALLS

CROSS-REFERENCE TO RELATED APPLICATION

This application is a 35 U.S.C. §371 National Phase Entry Application from PCT/SE2010/050473, filed Apr. 29, 2010, and designating the United States, the disclosure of which is incorporated by reference herein.

TECHNICAL FIELD

The present invention relates generally to a method and an apparatus for enabling identification of anonymous calling parties in a communications network.

BACKGROUND ART

In many communications networks which are presently used for telephony or telephony like services a calling party is normally provided with the option of not having to reveal his identity to the called party during call set-up and during the call. This feature, which enables a subscriber who has registered as an anonymous subscriber at his operator as an anonymous subscriber to maintain anonymous during the call, is available both in stationary, as well as wireless communication networks. When registered as an anonymous subscriber, such a calling party will typically be presented to a called party as "Anonymous", "Unknown" or with any other corresponding expression, rather than with his telephone number or any type of network identity. While the option of barring exposure of the network identity to the called party is often beneficial to the anonymous calling party, the called party may in many situations consider the information presented to him as much to sparse, since there is no way for the called party to make any kind of distinction between different anonymous calling parties.

Today, certain support for handling anonymous calls to at least some extent, exist in some communication standards. One such service is Anonymous Call Rejection (ACR). Services like ACR can, however can only be used for handling any anonymous call and thus all anonymous calls are handled the same way, without making any distinction between different anonymous calling parties.

A simplified scenario for setting up a call between an anonymous calling party 100 and a called party 103 can be described according to the scenario below with reference to the simplified signaling diagram of FIG. 1. It is to be understood that FIG. 1 is a simplified illustration where nodes and entities which are normally necessary for providing communication functionality but which are not necessary for the understanding of the call set-up procedure have been omitted for simplicity reasons. This also applies for the other scenarios described below with reference to FIGS. 2-4.

From hereinafter a calling party is to be referred to as a user device which is registered to a user, wherein the user device is configured to provide access to at least some communications network and to enable for the calling party to set up outgoing telephone calls as anonymous calls. In a corresponding way a called party is to be referred to as a user device registered to another user, wherein the second user device is configured to handle incoming anonymous calls.

An anonymous calling party 100, accessing a communication network via an access node, here represented by the first network node 101, is initiating a call to a called party 103 via another network node, here represented by second network node 102 as indicated with a first step 1:1. At the second network node 102 a calling party identification procedure is initiated, as indicated with another step 1:2, for the purpose of identifying the calling party to the called party. In the present scenario the calling party 100 is identified as being an anonymous calling party, which does not want to reveal its network identity to any called party upon call set-up, and thus instead of forwarding the identity of the calling party 100 to the called party 103, the text "Anonymous" or "Unknown" is typically presented at the display of a user device of the calling party 100, as indicated with a next step 1:3. In a next step 1:4, the called party 103 has accepted the incoming call and the call is set up and may continue for an arbitrary time interval, until the call is terminated by any of the parties, as indicated with a subsequent step 1:5.

If the same calling party 100 at a later occasion makes a new call to the called party 103, as indicated with a subsequent step 1:6, it will not be possible for the called party to be aware that this is the same calling party as for the previous call, when steps 1:7 and 1:8 are executed. The called party 103 will only be informed from the network that yet another call from some anonymous calling party is being set up.

With the exception for malicious calls that can be handled via services like Malicious Call handling service (MCID), which is an integrated Services Digital Network (ISDN) service that is sometimes found in conventional communication networks or the like, there is presently no way of making a called party aware of whether he has previously received any call from an anonymous calling party.

Consequently, there is no known way of how to distinct different anonymous calling party from each other and thus how to allow the called party to decide how to treat such an anonymous incoming call. Especially in situations where calls are frequently received from anonymous calling parties it can be very annoying for the called party to be disturbed by receiving anonymous calls, not knowing whether such calls are unwanted calls, while at the same time not wanting to risk to miss any wanted call.

Also in situations where calls from anonymous calling parties are only received occasionally it may be annoying not to be able to identify the calling party. A situation may even arise where the calling party does not even want to appear as anonymous to a particular called party, but only to other called parties in general. Also in these situations there is no known method for allowing the called party to make any kind of distinction between different anonymous users.

SUMMARY

An object of the present document is to address at least some of the problems outlined above. In particular, it is an object of the present document to provide a mechanism that enables identification of anonymous calling parties, thereby enabling a called party receiving a telephone call from an anonymous calling party to tell different anonymous calling parties from each other, such that he can easily choose to accept or reject such a call at an early stage in the call set-up procedure.

These objects and others may be obtained by using the method and apparatus according to the attached independent claims.

According to one aspect, a method at an apparatus of a communications network for handling an incoming call originating from an anonymous calling party is provided, where an anonymous calling party is identifiable on the basis of a personal identity assigned to the anonymous calling party, wherein the personal identity is assignable to the anonymous calling party without requiring any interaction from the anonymous calling party.

An advantage with such a feature is that a called party receiving an incoming call from an anonymous calling party will be able to treat such calls differently, in an easy and user friendly way, without requiring any participation from the calling party.

Once a call has been received from an anonymous calling party a service for handling incoming anonymous calls, implemented in the communications network enables for a personal identity to be assigned to the anonymous calling party in case no personal identity has already been assigned for the anonymous calling party and for storing the assigned personal identity in a list, which is used for listing anonymous calling entities for which a personal identity has been assigned. In case a personal identity has previously been assigned for the anonymous calling party the anonymous calling party is instead identified on the basis of a personal identity stored in the list.

According to one embodiment enabling for a personal identity to be assigned may be achieved by comparing information of the anonymous calling entity to the content of the list, after which a personal identity is assigned to the anonymous calling party in case no match is found in the list and in case of receiving an instruction to assign a personal identity to the anonymous calling party. Such an instruction may either be an automatically initiated instruction which is initiated upon recognizing no match during a comparison of the information of the anonymous calling.

According to one embodiment, an assigned personal identity is presented on a user device registered to the called party, such that the called party can identify the anonymous calling party.

According to another embodiment the assigned personal identity may be made accessible to a supplementary service, which may make use of this information for making distinctions between different anonymous users when the service is executed.

According to yet another embodiment an authorized user, which may be the called party or another party, may be allowed access to a call log, comprising at least one entry indicating a call previously received by the called party from the anonymous calling party, when such a request has been received from the authorized user. Once the call log is accessed, a personal identity may be assigned to the anonymous calling party, wherein the list is updated accordingly, in response to receiving an instruction to assign a personal identity to the anonymous calling party from the authorized user.

According to a further embodiment an authorized user may also be provided with the option to edit the one or more entries carrying information of an anonymous calling party and to update the list, such that a personal identity is assignable to the anonymous user in case no personal identity has been previously assigned for the anonymous user indicated by the entry, and/or such that the entry can be modified in case a personal identity has already been assigned for the anonymous user indicated by the entry.

An advantage with being able to assign a personal identity by editing a call log is that such an assignment does not have to be made during a call, but can be made at any time instance which is most convenient for the calling party. In addition, by being able to edit not only an entry associated with an anonymous calling party for which no personal identity has been assigned, but also assigned personal identities, the anonymous calling parties can be easier to distinct from each others. Furthermore, by editing entries associated with anonymous calling parties, the respective anonymous calling parties can be listed separately, thereby enabling for a supplementary service to treat anonymous calling parties which have been listed differently according to different strategies.

According to another aspect, an apparatus for implementation in a communications network which is suitable for performing the method for handling an incoming call originating from an anonymous calling party as described above is provided.

According to one exemplary embodiment, such an apparatus is provided with an identification unit which enables identification of the anonymous calling party on the basis of a personal identity assigned to the anonymous calling party, and an assigning unit which is configured to assign a personal identity to the anonymous calling party without requiring any interaction from the anonymous calling party.

The suggested apparatus typically also comprises a communication unit for receiving a call from the anonymous calling party. The assigning unit is also typically configured to enable for a personal identity to be assigned to the anonymous calling party in case no personal identity has already been assigned for the anonymous calling party and for storing an assigned personal identity in a list, wherein the identification unit is configured to identify the anonymous calling party on the basis of a personal identity stored in the list in case a personal identity has previously been assigned for the anonymous calling party.

The identification unit may be configured to compare information of the anonymous calling party to the content of the list, wherein the assigning unit is configured to assign a personal identity to the anonymous calling party in case no match is found in the list and in case an instruction to assign a personal identity to the anonymous calling party is received by the assigning unit. The assigning unit may be configured to assign a personal identity to the anonymous calling party in response to receiving a user initiated instruction, which may comprise a feature access code, i.e. in response to a manually initiated activity, a feature access code.

Alternatively, or in combination, the assigning unit may be configured to automatically assign a personal identity to the anonymous user in response to receiving an automatically initiated instruction from the identification unit, wherein at the identification unit (601) the instruction is triggered by no match during the comparison.

In addition, the apparatus typically also comprises a presentation unit which is configured to present the assigned personal identity on a user device registered to the called party.

The apparatus may also, or as an alternative, to present an assigned personal identity to a calling party, be configured to make the assigned personal identity accessible to a supplementary service, such that the supplementary service can make use of the personal identity, whenever required.

The presentation unit of the apparatus may also be configured to provide an authorized user access to a call log in response to receiving such a request from the authorized user, wherein the call log comprises at least one entry indicating a call previously received by the called party from the anonymous calling party, and to assign a personal identity to the anonymous calling party, after which the list is updated accordingly in response to receiving an instruction to assign a personal identity to the anonymous calling party from the authorized user.

In addition to providing for later assignment of a personal identity the presentation unit may further be configured to enable an authorized user to edit the one or more entries associated with anonymous calling parties, such that the entry can be modified in case a personal identity has already been assigned for the anonymous user indicated by the entry.

Further features of the present invention and its benefits can be understood from the detailed description following below.

BRIEF DESCRIPTION OF THE DRAWINGS

The invention is now described, by way of example, with reference to the accompanying drawings, in which.

DETAILED DESCRIPTION

Figure 1:
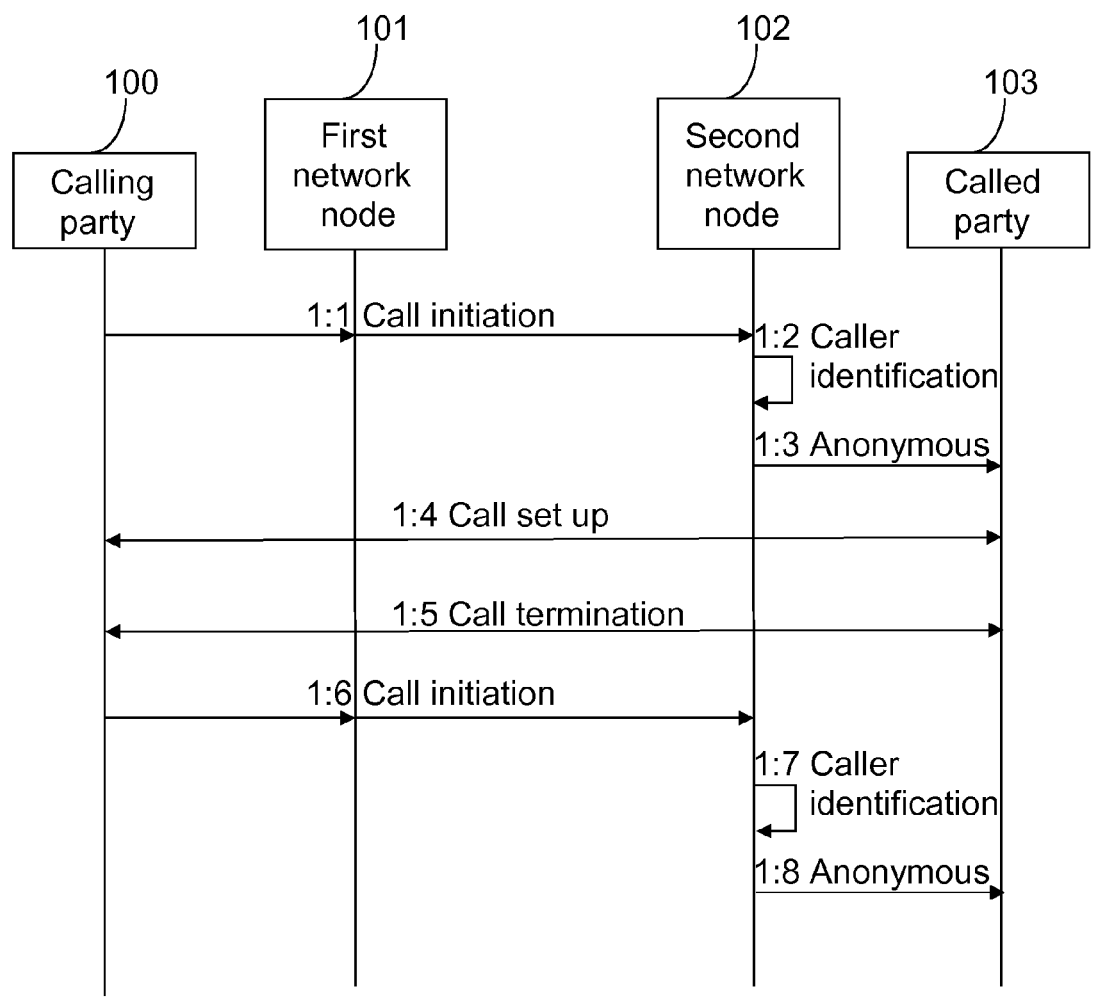
FIG. 1 is a signaling scheme illustrating a method for handling a call originating from an anonymous calling party according to the prior art.

Considering how anonymous calls can be handled in communication systems presently available, it is desirable to be able to tell different anonymous calling parties from each other, if these anonymous calling parties makes repeated call attempts to the same called party, such that a personal identity, rather than a general "anonymous" indication can be used for presentation to the called party by applying any commonly used supplementary telephony service. Calling Name identification Presentation (CNIP) is a supplementary service available in ISDN based and mobile networks which is used for showing the name of a calling party, while Calling line Identification Presentation (CIIP) is another supplementary service that instead shows the number of the calling party. Originating Identification Presentation (OIP) is a corresponding service provided in IMS. Other supplementary telephony services which may make use of the calling party identity, includes Communication Diversion (CDIV) which enables a diverting user to divert communications addressed to diverting users to another destination, and Communication Barring (CB), which is a supplementary service which enables a user to selectively block call session attempts.

As already indicated above communication networks of today are often configured such that the CNIP or CIIP identity of the Calling Party is known to the network, but once the calling party is registered as an anonymous calling party this information is suppressed at the terminating part of the network. In GSM networks such a function is typically controlled by a Calling line Identification Restriction (CIIR).

Briefly described, the present document describes a mechanism for enabling for a called party to make a distinction between anonymous calling parties that have made a call to the called party at any earlier occasion, if during, or after, that earlier occasion the called party has been assigned a personal identity.

More specifically, a call coming in to a called party from a calling party presented as an anonymous calling party can be assigned a personal identity, either instantly when receiving the call, or at a later occasion by editing a call log. If, at a later occasion, the anonymous calling party is calling the same called party, the stored personal identity is retrieved and can be provided to the called party, or to a supplementary service such as e.g. CDIV or CB, or any other supplementary service which may make use of the personal identity.

One exemplary way of handling an incoming anonymous call according to the general principle described above will now be described in more detail with reference to the simplified signaling diagram of FIG. 2, where an anonymous calling party 100 is accessing a called party 103 via a first network node 101 and a second network node 200. In a first step 2:1 a call originating from a calling party 100 is first initiated, and at the second network node 200 it is determined that the call attempt is originating from an anonymous calling party. In a next step 2:2 it is determined whether the anonymous calling party 100 has called the called party 103 previously, and whether a personal identity has been assigned to the anonymous calling party 100 in association with such a call. This can be determined by checking if the calling party identity of the anonymous calling party 100, which according to conventional call set up procedures is normally presented to a called party, and which is accessible by the second network node 200 also in case of an anonymous calling party, is registered on a list together with an associated assigned personal identity.

In the present example, it is assumed that no such call has been set up previously, and thus, no mach is found in step 2:2. Therefore an automatic procedure for assigning a personal identity for calling party 100 is triggered, as indicated with a next step 2:3. An automatic assigning procedure will typically comprise assigning a personal identity to an anonymous calling party, and storing the assigned personal identity together with the calling party identity. The personal identity assignable by the second network node 200 comprises the deriving of a unique identity which enables later distinction of the anonymous calling party 100 from other anonymous calling parties which have called the called party 103, and for which a personal identity is assigned. In addition, the personal identity is registered together with a code which is indicating that the code is an assigned personal identity, or alternatively that it is an automatically assigned personal identity. An assigned personal identity may e.g. be identifiable by special characters "\*" such that if an anonymous calling party is assigned personal identity "1", "\*1" is stored for the anonymous calling party. In a subsequent step 2:4, the assigned personal identity is presented to the called party 103, typically by applying CUP or CNIP, depending on which service that is supported by the user device of the called party 103. Legacy PSIN user terminals may e.g. be provided with number presentation only, according to CIIP or any other corresponding presentation service. Once the assigning process is completed the call can be set up, as indicated with a step 2:5, and later terminated, as indicated with a subsequent step 2:6.

If, at a later occasion, the anonymous calling party 100 is initiating a new call to the called party 103, as indicated with step 2:7, the second network node 200, identifying the incoming call as an anonymous call, responds to the call by, in resemblance to earlier step 2:2, once again check the list of assigned personal identities, as indicate with a step 2:8. This time, however, there will be a match and the previously assigned personal identity can be provided to the called party, as indicated with a step 2:9.

The suggested assignment procedure enables a called party to identity an anonymous calling party, in case the calling party has called the called party at least once previously, without requiring any interaction from the called party. According to another embodiment, such a procedure may instead be implemented as a manual procedure. Such a procedure according to one exemplary embodiment will now be described with reference to the simplified signaling scheme of FIG. 3.

Figure 2:
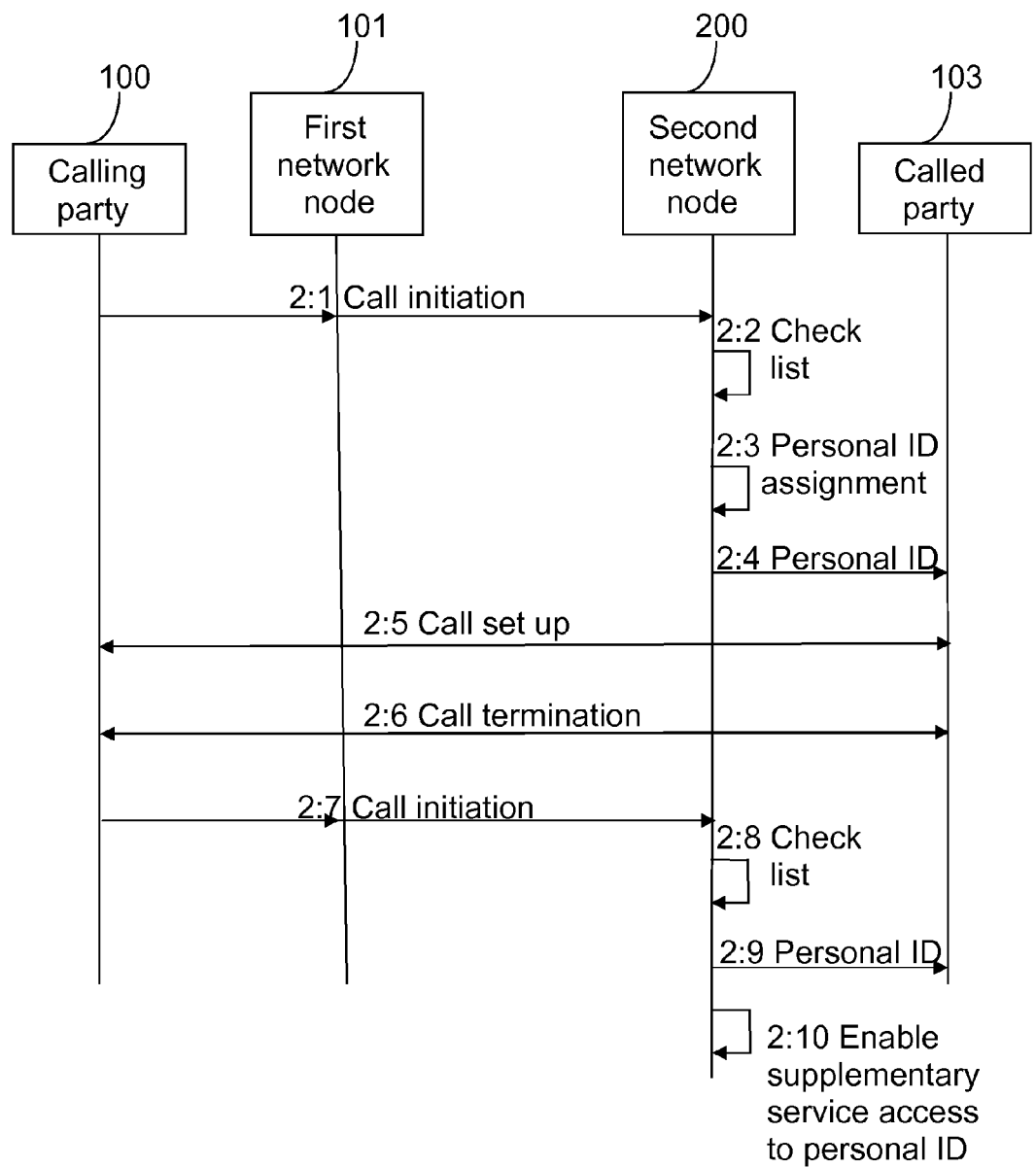
FIG. 2 is a signaling scheme illustrating a method for enabling identification of an anonymous calling party according to one exemplary embodiment.
Figure 3:
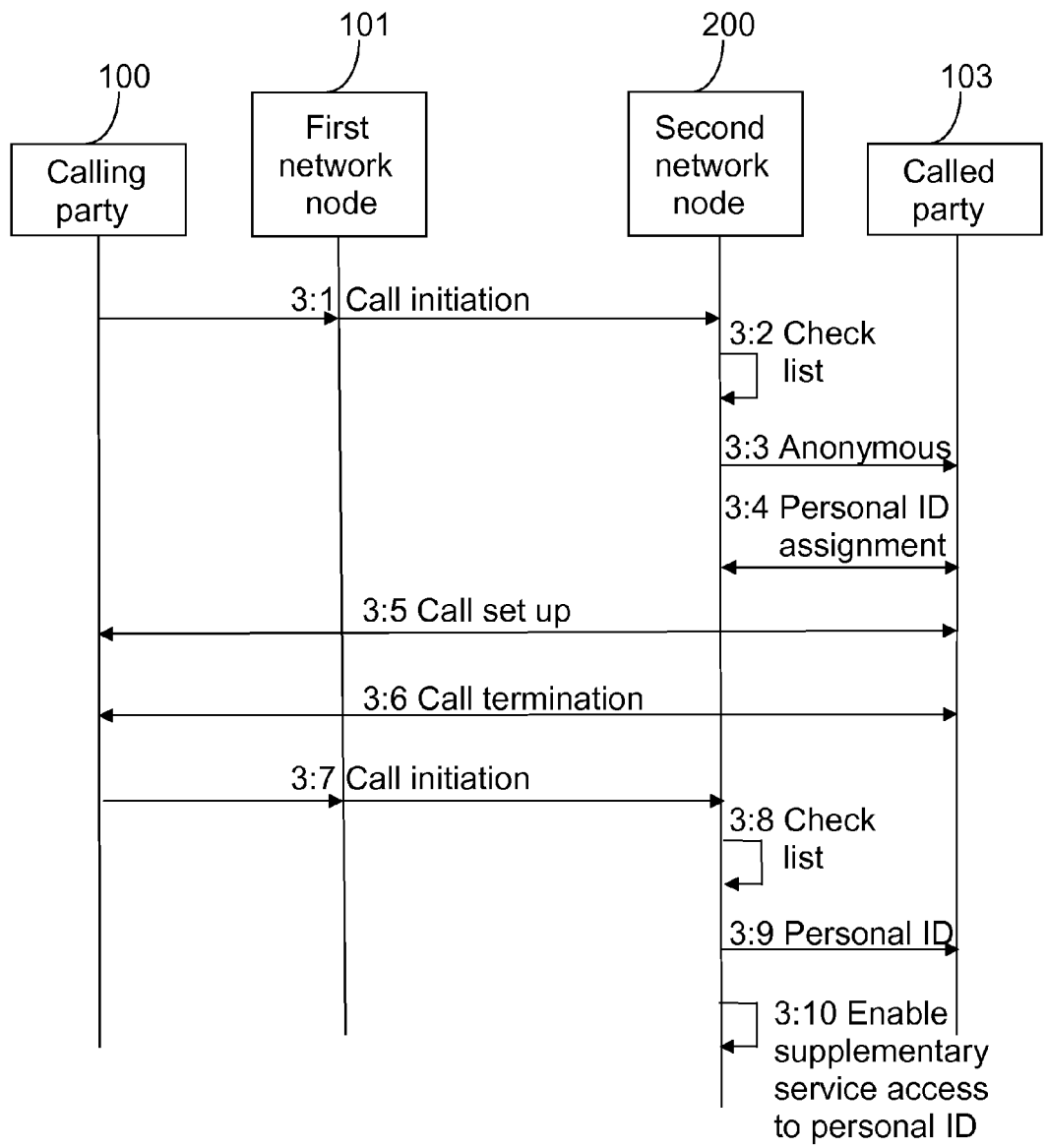
FIG. 3 is another signaling scheme illustrating a method for enabling identification of an anonymous calling party according to another exemplary embodiment.

According to FIG. 3 an anonymous calling party 100 chooses to initiate a call set up towards the called party 103, as indicated with a first step 3:1, after which the second network node 200 initiated a procedure for checking for a personal identity of the calling party 100, in a corresponding way of step 2:2 in FIG. 2. However, comparing to the embodiment of FIG. 2, in case of no match in the list of assigned personal identities, the called party 103 is presented with the information "Anonymous" instead of the identity of the calling party 100, all according conventional call set-up procedures.

Once the called party 103 has been made aware that the call-set up attempt is originating from an anonymous calling party he may either continue the call set up procedure according to conventional procedures as represented by steps 3:5 and 3:6. Alternatively he may choose to assign a personal identity to the anonymous calling party 100, as indicated with a step 3:4, by interacting with the communications network, represented by the second network node 200 in FIG. 3.

The procedure for assigning a personal identity may be available to the called party 103 for a predefined time interval, such that at any time before the end of time interval, the called party may choose to assign a personal identity to the calling party. Alternatively, this option may be available for the whole duration of the call, i.e. step 3:4 of FIG. 3 may in such a case be executed also after call set up has been completed.

If the suggested assigning procedure is configured as a manual procedure, the called party 103 will typically be provided with an option to enter a predefined code, such as e.g. a feature access code, together with a personal identity chosen by the called party 103. As an example the code "*12*1#" may e.g. represent the assignment of personal code 1 to an anonymous calling party. If an already assigned personal identity is inserted by the called party, the assigning procedure may comprise a further step where the called party is notified of this and is given the option to choose another, not already active personal identity.

Alternatively, a semi automatic assigning procedure may be configured such that after the called party has initiated an assignment procedure, according to step 3:4, by entering a code representing assignment of a personal identity, a previously not assigned personal identity is provided to the called party. In case the called party approved with the given personal identity, the assignment procedure is successfully completed.

In case of an automatic or semi-automatic procedure, once a call is once again received from the calling party 100, now having a personal identity assigned to it, as indicated with a subsequent step 3:7, the personal identity of the calling party 100 is found in the list as indicated with step 3:8, and the called party is provided with the assigned personal identity, as indicated with a final step 3:9. Accordingly, the procedure represented by steps 3:7-3:9 corresponds to the procedure represented by steps 2:7-2:9 of FIG. 2.

The suggested assignment procedure may be executed by presenting the options to the called party 103 visually on a display, or by applying interactive voice response, according to any conventional user interaction procedure.

Alternatively, or in combination with providing an assigned personal identity to a called party, both the method according to the first and the second embodiment, may be arranged such that when a match is found in step 2:8 or step 3:8, respectively, the respective personal identity is provided to a supplementary service which may make use of the identity when executing a service which to at least some extent rely on the identity of the calling party. Such an optional or alternative step is indicated with steps 2:10 and 3:10 respectively.

According to yet another embodiment, which will now be described in more detail with reference to FIG. 4, a called party 103 receiving a call from an anonymous calling party 100 may have the option to access a call log, showing a compilation of telephone calls previously received from an anonymous calling party via a graphical user interface (GUI), such as e.g. a self-management Web-service.

Figure 4:
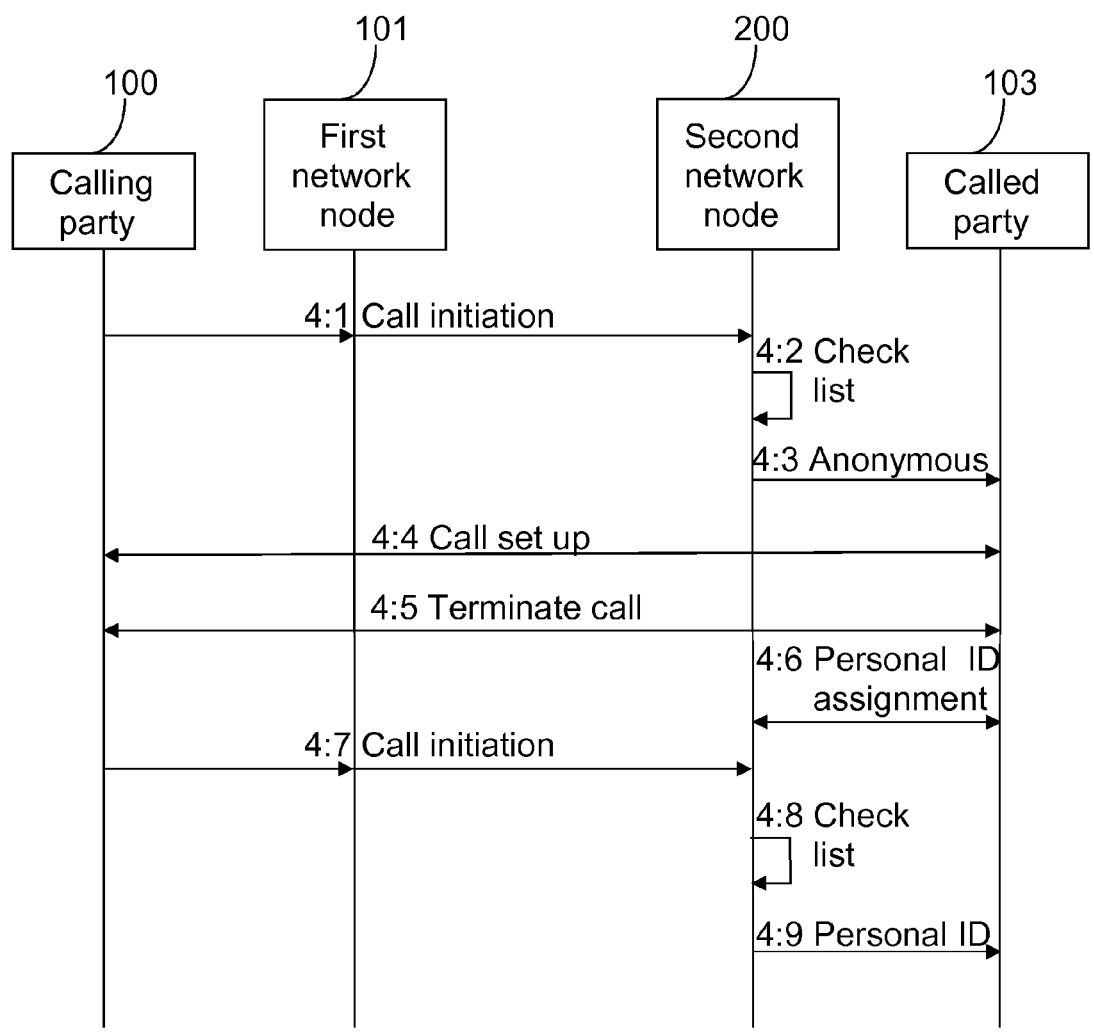
FIG. 4 is another signaling scheme illustrating a method for enabling identification of an anonymous calling party according to yet another exemplary embodiment.

The embodiment according to FIG. 4, differs basically from the two embodiments described above in that an assignment of a personal identity, represented by step 4:6 in FIG. 4, can be initiated at any time without requiring a call to be set up. Access to the call log can be provided to the called party 103, or to any other user for which access to the call log has been authorized.

When an authorized party, in this case the called party 103, access a call log of a called party for the purpose of assigning a personal identity, according to step 4:6, the called party 103 will be able to get an overview of the latest calls received from anonymous calling parties from the call log. By editing one of the entries associated with a specific anonymous call the called party 103 may enter a code representing a request for assigning a personal identity and an identity of the choice of the called party 103. Alternatively, or in addition, it may be possible to accompanying an assigned personal identity with a text string, which may help to make an anonymous calling party easier to identify. Alternatively, an instruction for assigning a personal identity may trigger an automatically initiated assigning procedure, according to step 2:3 of FIG. 2. Step 3:4 also comprises an update of the list of assigned personal identities and storing of the updated information for later retrieval.

By providing the option to assign a personal identity via a call log, the authorized party will have a better overview of all the latest calls received from an anonymous calling party. The authorized party may thus be able to tell calls received from different anonymous calling parties from each other e.g. from the time of receiving the call, which is a type of information which is typically available in a call log, and to decide to assign a personal identity to an anonymous calling party also after a call received from the respective anonymous calling party has been terminated.

In addition to assigning a personal identity after a call has been terminated, the feature of providing access to a call log may also be configured such that an authorized party can edit an already assigned personal identity indicated together with a specific call received from an anonymous calling party, such that later identification of different anonymous calling parties can be simplified even more.

Assuming for example that you are often called by sales persons identifying themselves as anonymous calling parties. You also have a friend with a private number, i.e. presented as an anonymous calling party, which is calling you from time to time. You now wish to be able to easily tell in advance whether it is your friend or someone else, most likely unknown calling party, who is calling you anonymously. A personal identity presented e.g. as "2", which has earlier been assigned to your friend, and which may possibly be stored together with a text string, such as e.g. "Assigned personal identity" can be identified from the time of making the call as registered in the call log. Once identified "2" may then be replaced by information which is more easily identifiable, such as e.g. "MyBuddy 2", or "Anonymous MyBuddy 2" indicating that the assigned personal identity 2 has been assigned my friend. Editing may be performed directly via a display of the call log or via a display of the respective list, which can be accessible via the call log.

Access to a call log may also enable an authorized user to arrange calls received from anonymous calling parties on a "white list" or a "black list". Such that when a call is received from an anonymous calling party registered as a "white list party", this call is connected to that called party in a conventional manner, while an anonymous calling party registered as a "black list party" is barred. More specifically such a white-/blacklist feature may be implemented by enabling a supplementary service access to the updated white-/blacklist, simultaneously with being provided access to a personal identity in step 2:10 or 3:10.

Figure 5:
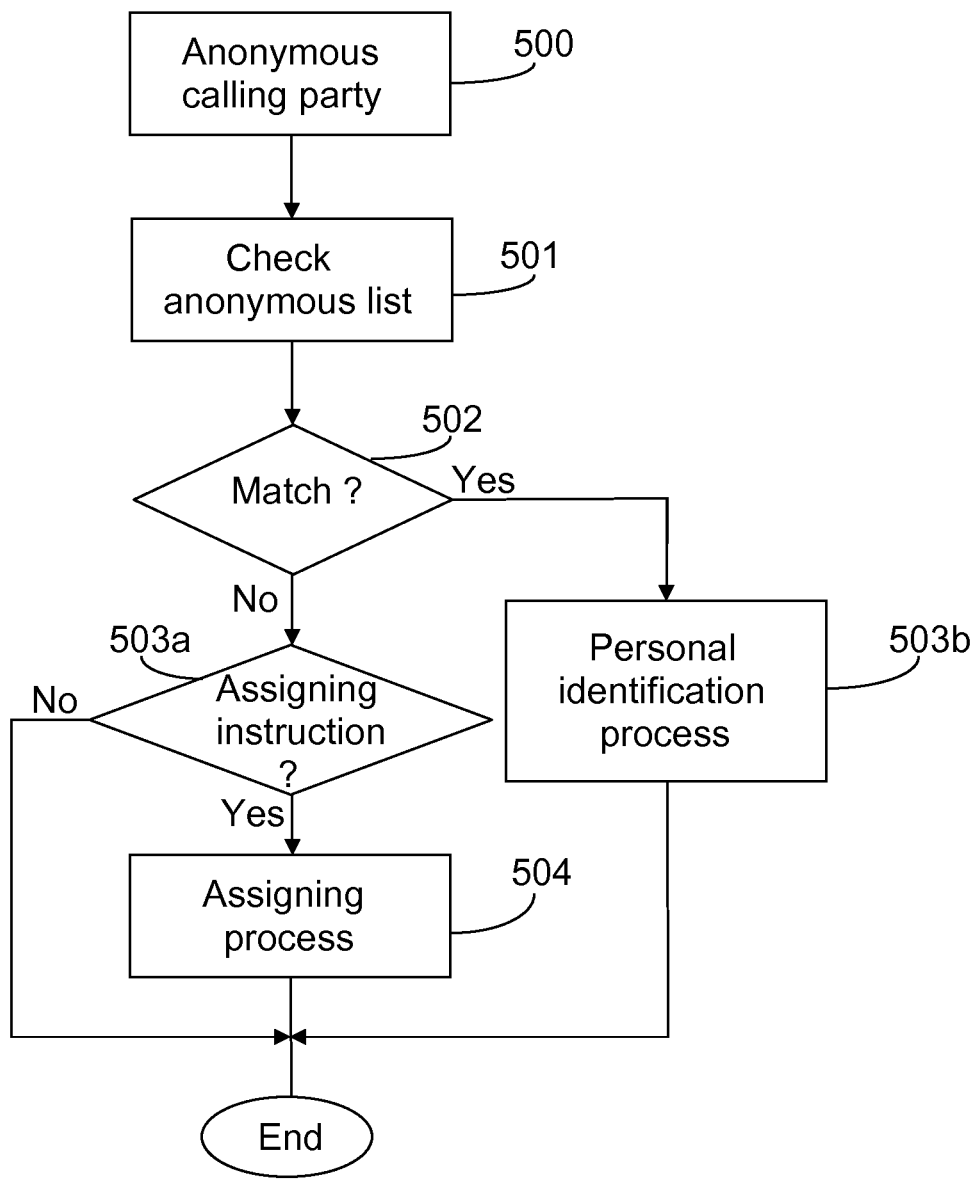
FIG. 5 is a simplified flow chart illustrating an exemplary method for handling a call from an anonymous calling party.

The method described with the various embodiments above, may be described in general terms according to the flow chart of FIG. 5, where, according to a first step 500, the suggested method is initiated by an application, which is typically implemented on a network node, identifying a received incoming call as an anonymous call. Alternatively an anonymous calling party of a call log is identified by a supplementary service. According to the suggested method, a call identified as an anonymous call, or the registering of an anonymous calling party by a supplementary service triggers a checking procedure, where a list, which may be referred to e.g. as an anonymous list, comprising a listing of previously assigned personal identities and their associated calling party identity, is checked against the calling party identity available in the call initiation signaling. Such a checking procedure is indicated with another step 501.

In case of no match, i.e. it is found in a step 502 that no personal identity has been assigned for the calling party, it is determined in a subsequent step 503*a* whether any instruction to assign a personal identity to the anonymous calling party is received from the called party, or from any supplementary service which may have been initiated by a user editing a log file. As already indicated above, such an option may be time limited or available throughout a telephone call. In case of editing a log file, this step is typically not time dependent.

If an instruction, which, dependent on the applied configuration, may be initiated automatically or manually, e.g. as a feature access code, is recognized in step 503*a*, an assigning process is initiated, as indicated with a subsequent step 504. As already mentioned the assigning process may in case of an automatically initiated assigning process comprise steps for assigning a personal identity, while a manually initiated assigning process comprise steps for allowing a called party to manually interact with the assigning process to assign a personal identity to the anonymous calling party. After the assigning process has been completed the method is terminated any will be reactivated when a call is received from another anonymous calling party, wherein the procedure described above is repeated, or if a call from the same anonymous calling party is once again received by the same called party.

In the latter case step 502 will result in a match and thus a personal identification process as indicated in step 503*b* will be triggered. Dependent on the configuration, the personal identification process may comprise presentation of the anonymous calling party to the called party or the step of providing a supplementary service access to the identified personal identity, or the combination of both. Providing a supplementary service access to the identified personal identity may e.g. comprise the step of transmitting the personal identity, with or without an instruction, to the supplementary service. Alternatively, the personal identification process may arrange for an updating of a database or list which to which the supplementary service has access.

Figure 6:
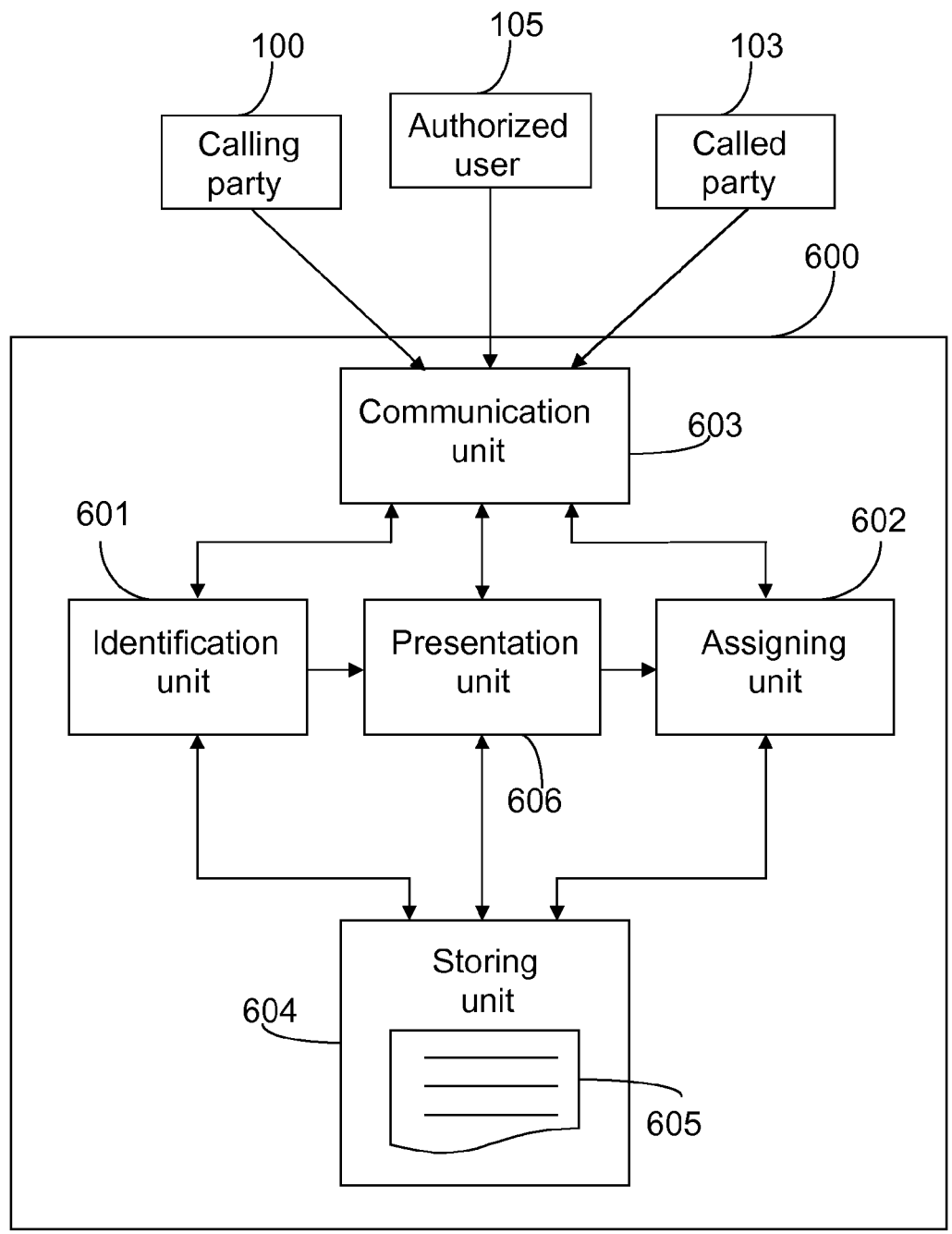
FIG. 6 is a simplified block scheme illustrating an exemplified architecture of an apparatus which enables implementation of an identification mechanism according to one or more of the embodiments described with reference to any of FIGS. 2-5.

The method suggested above discloses a service for handling calls from anonymous calling parties which is typically implemented on a network node of a communications network which is accessible both by the calling party and the called party. FIG. 6 is a simplified illustration of an apparatus 600 for handling calls from anonymous calling parties according to the general method and any of the embodiments described above, where the described apparatus 600 may be as an integrated part of a communications network node 200 or as a separate part which is configured to interact with the conventional communications functionality, directly or indirectly via communications node 200. It is to be understood that the apparatus 600 of FIG. 6 only describe one possible example of implementing functionality for enabling processing of anonymous calling parties according to the suggested principles, and that any additional functional unit which may typically be used in a conventional communications network but which is not necessary for the understanding of the underlying assignment process have been omitted for simplicity reasons.

The apparatus 600 of FIG. 6 comprises an identification unit 601 which enables identification of an anonymous calling party 100 on the basis of a personal identity assigned to the anonymous calling party 100. The identification unit 601 has access to a list 605, which may be referred to as an anonymous list, where the list 605 comprises a listing of personal identities assigned to anonymous calling parties and the official identity, or network identity, of the anonymous calling party. The list may be stored in a storing unit 604, and even though FIG. 6 only comprises one list there may typically be one list per called party available in the apparatus 600. The identification unit 601 is configured to handle a call from an anonymous calling party 100 by initiating an identification process where an anonymous calling party 100 is being identified on the basis of a personal identity stored in the list 605 in case a personal identity has previously been assigned for the anonymous calling party 100.

The apparatus 600 also comprises an assigning unit 602, which is configured to assign a personal identity to an anonymous calling party 100 in case no personal identity was found in the list 605 by identification unit 601 and in case an instruction to assign a personal identity to the anonymous calling party 100 is received by the assigning unit 602. The assigning unit 602 may be configured to receive and handle an automatically or manually generated instruction, which may comprise a feature access code, from the called party 103 or from an authorized user 105 accessing a personal identity via a call log.

The assigning unit 602 is also configured to store an assigned personal identity in the list 605. In addition, the apparatus 600 comprises a presentation unit 606, configured to present an assigned personal identity on a user device registered to the called party 103 in response to the outcome of an identification process executed by the identification unit 601. The presentation unit may be configured to present an anonymous calling party as a text string or at least one character together with its associated personal identity, or a combination thereof.

The presentation unit 606 may also be configured to provide an authorized user 105, which may be the called party 103 or another calling party, access to a call log in response to receiving such a request from the authorized user 105,103, e.g. via a Web-service. A Web-service or any other corresponding service may be accessible via presentation unit 606 using any type of conventional communications means. Since a call log typically comprises one or more entries indicating calls previously received by the called party 103, including calls received from the anonymous calling party 100, the presentation unit 606 providing access to the call log enables an authorized user 105, 103 to edit an entry of an anonymous calling party 100, to assign a personal identity to the anonymous calling party 100 and to store the assigned personal identity in the list 605 in response to receiving an instruction to assign a personal identity to the anonymous calling party 100 from the authorized user 105,103.

Furthermore, the presentation unit 603 may be configured to enable the authorized user 105,103 to edit the at least one entry of the list 605, such that a personal identity is assignable in case no personal identity has been previously assigned for the anonymous user 100 indicated by the entry, and/or such that an entry comprising a previously assigned personal identity can be modified.

In order for the calling party 100, the called party 103 and optionally also an authorized user 105 to be able to access the functional units of the apparatus 600, the apparatus 600 also comprises a communication unit 603, which enables an external entity to access any if the identification unit 601, the presentation unit 606 and the assigning unit 602 via a communication unit 603.

It is to be understood that although all the functionality for enabling handling of anonymous callers has been described as implementable on one single apparatus forming part of the communications network it is to be understood that park of or all of the functionality for providing this feature may be distributed to one or more other network nodes. To exemplify, a service providing access to a log file may be executable on any type of external server which may be accessed via the presentation unit 606 or any corresponding functional entity. In addition, one or more listings storing assigned personal identities may be stored on a separate network node which provides storing possibilities, as long as such a network node is accessible via the communication unit 603 or any corresponding functional entity.

Furthermore, although the identification unit 601 is communicating with the assigning unit 602 FIG. 6 via presentation unit 606, it is to be understood that the identification unit 601 may be configured to communicate directly with the assigning unit 602, without requiring any involvement from the presentation unit 606. According to yet another embodiment the functionality for presentation of a personal identity may be configured separately from the functionality which allows editing of a log file.

While the invention has been described with reference to specific exemplary embodiment, the description is generally only intended to illustrate the inventive concept and should not be taken as limiting the scope of the suggested mechanism for handling calls from anonymous calling parties, which is defined by the appending claims. The described mechanism is suitable for implementation in communications networks which are offering wireless, as well as fixed access, and is also suitable for implementation and support of various communications standards and protocols which are providing telephony services, and wherein the possibility of registering as an anonymous calling party is available.

ABBREVIATIONS LIST

ACR Anonymous Call Rejection
CB Communication Barring
CDIV Communication Diversion
CIIP Calling line Identification Presentation
CIIR Calling line Identification Restriction
CNIP Calling Name identification Presentation
ISDN Integrated Services Digital Network
OIP Originating Identification Presentation
NCID Malicious Call handling service
FSTN Public Switched Telephone Network

The invention claimed is:

1. A method implemented in a communications network apparatus configured to handle an incoming call originating from a calling party presented as an anonymous calling party, wherein the calling party is identifiable on the basis of a personal identity assigned to the calling party, and the personal identity is assignable to the calling party without requiring any interaction from the calling party, the method comprising:
  receiving a call from the calling party;
  checking if a calling party identity of the calling party is registered on a list together with a personal identity assigned to the calling party;
  enabling for the personal identity to be assigned to the calling party when no personal identity has already been assigned to the calling party and for storing the assigned personal identity in a list;
  enabling for said calling party to be identified by a called party on the basis of the personal identity stored in the list when the personal identity has previously been assigned to the calling party;
  providing an authorized user access to a call log in response to receiving such a request from the authorized user, when the call log comprises at least one entry indicating a call previously received by the called party from the calling party, and
  enabling the authorized user to assign the personal identity to the calling party and to update the list with the assigned personal identity in response to receiving an instruction to assign a personal identity to the calling party from the authorized user,
  wherein a telephone number associated with the calling party presented as an anonymous calling party is not provided to the called party.

2. The method according to claim 1, wherein the step of enabling for the personal identity to be assigned comprises:
  comparing information of the calling party to content of the list;
  receiving an instruction to assign a personal identity to the calling party if no match is found on the list;
  assigning the personal identity to the anonymous calling party if no match is found in the list.

3. The method according to claim 2, wherein the instruction is a user initiated command.

4. The method according to claim 2, wherein the instruction comprises a feature access code.

5. The method according to claim 2, wherein the instruction is automatically initiated upon recognizing no match during said comparison of the information of the calling entity to the content of the list.

6. The method according to claim 1, further comprising making the assigned personal identity accessible to a supplementary service.

7. The method according to claim 1, further comprising presenting the assigned personal identity on a user device registered to the called party.

8. The method according to claim 1, further comprising: enabling the authorized user to edit the at least one entry and to update the list, such that a personal identity is assignable to the calling party when no personal identity has been previously assigned to the calling party indicated by the entry, and/or such that the entry can be modified when a personal identity has already been assigned to the calling party indicated by the entry.

9. A communications network apparatus configured to handle an incoming call originating from a calling party presented as an anonymous calling party, comprising:
   an identification unit which enables identification of the calling party on the basis of a personal identity assigned to the calling party;
   an assigning unit which is configured to assign the personal identity to the calling party without requiring any interaction from the calling party; and
   a communication unit for receiving a call from the calling party, wherein
   the assigning unit is configured to enable for the personal identity to be assigned to the calling party when no personal identity has already been assigned to the calling party and for storing the assigned personal identity in a list, and wherein
   the identification unit is configured to enable a called party to identify the calling party on the basis of the personal identity stored in the list when the personal identity has previously been assigned to the calling party, and
   wherein a telephone number associated with the calling party presented as an anonymous calling party is not provided to the called party, and
   wherein the presentation unit is further configured to provide an authorized user access to a call log in response to receiving such a request from said authorized user, wherein the call log comprises at least one entry indicating a call previously received by the called party from the calling party, and to assign the personal identity to the calling party and to update the list in response to receiving an instruction to assign a personal identity to the calling party from the authorized user.

10. The apparatus according to claim 9, wherein the identification unit is further configured to compare information of the calling party to content of the list, and wherein the assigning unit is further configured to assign the personal identity to the calling party when no match is found in the list and when an instruction to assign a personal identity to the calling party is received by the assigning unit.

11. The apparatus according to claim 10, wherein the instruction is a user initiated instruction.

12. The apparatus according to claim 10, wherein the instruction comprises a feature access code.

13. The apparatus according to claim 10, wherein the assigning unit is further configured to automatically assign the personal identity to the calling party in response to receiving an automatically initiated instruction from the identification unit, and wherein the identification unit is further configured to trigger the instruction in response to not recognizing any match during the comparison.

14. The apparatus according to claim 10, wherein the identification unit is further configured to make the assigned personal identity accessible to a supplementary service.

15. The apparatus according to claim 10, further comprising a presentation unit configured to present the assigned personal identity on a user device registered to the called party.

16. The apparatus according to claim 9, wherein the presentation unit is further configured to enable the authorized user to edit the at least one entry, such that a personal identity is assignable when no personal identity has been previously assigned for the calling party indicated by the entry, and/or such that the entry can be modified when a personal identity has already been assigned for the calling party indicated by the entry.

17. A method implemented in a communications network apparatus comprising a first network node and a second network node, the method comprising:
   receiving, at the second network node, a call initiated at the first network node and triggered by the reception of an incoming call from a calling party;
   determining, at the second network node, that the calling party is an anonymous calling party;
   determining, at the second network node, whether the anonymous calling party has called the called party previously, and whether a personal identity has been assigned to the anonymous calling party in association with such a previous call;
   assigning, at the second network node, a personal identity for the calling party, if no personal identity has been assigned before;
   providing to the called party, by the second network node, the personal identity for the calling party, if a personal identity has been assigned before,
   providing an authorized user access to a call log in response to receiving such a request from the authorized user, when the call log comprises at least one entry indicating a call previously received by the called party from the calling party, and
   enabling the authorized user to assign the personal identity to the calling party and to update the list with the assigned personal identity in response to receiving an instruction to assign a personal identity to the calling party from the authorized user,
   wherein a telephone number associated with the calling party presented as an anonymous calling party is not provided to the called party.

* * * * *

UNITED STATES PATENT AND TRADEMARK OFFICE
CERTIFICATE OF CORRECTION

| | | |
|---|---|---|
| PATENT NO. | : 9,191,498 B2 | Page 1 of 2 |
| APPLICATION NO. | : 13/643740 | |
| DATED | : November 17, 2015 | |
| INVENTOR(S) | : Österlund | |

It is certified that error appears in the above-identified patent and that said Letters Patent is hereby corrected as shown below:

Title Page

Item (75), under "Inventors", in Column 1, Line 1, delete "Ekero" and insert -- Ekerö --, therefor.

Item (57), under "ABSTRACT", in Column 2, Lines 3-4, delete "calling party calling party (100)" and insert -- calling party (100) --, therefor.

Specification

In Column 2, Line 26, delete "integrated" and insert -- Integrated --, therefor.

In Column 5, Lines 44-45, delete "Calling line Identification Presentation (CIIP)" and insert -- Calling Line Identification Presentation (CLIP) --, therefor.

In Column 5, Line 56, delete "CIIP" and insert -- CLIP --, therefor.

In Column 5, Line 61, delete "Calling line Identification Restriction (CIIR)." and insert -- Calling Line Identification Restriction (CLIR). --, therefor.

In Column 6, Line 52, delete "CUP" and insert -- CLIP --, therefor.

In Column 6, Line 54, delete "PSIN" and insert -- PSTN --, therefor.

In Column 6, Line 55, delete "CIIP" and insert -- CLIP --, therefor.

In Column 7, Line 22, delete "call-set up" and insert -- call set up --, therefor.

In Column 11, Line 15, delete "presentation unit 603" and insert -- presentation unit 606 --, therefor.

Signed and Sealed this
Seventh Day of June, 2016

Michelle K. Lee
*Director of the United States Patent and Trademark Office*

CERTIFICATE OF CORRECTION (continued)
U.S. Pat. No. 9,191,498 B2

Specification

In Column 11, Line 31, delete "park of" and insert -- parts of --, therefor.

In Column 12, Line 2, delete "CIIP Calling Iine" and insert -- CLIP Calling Line --, therefor.

In Column 12, Line 3, delete "CIIR Calling Iine" and insert -- CLIR Calling Line --, therefor.

In Column 12, Line 7, delete "NCID" and insert -- MCID --, therefor.

In Column 12, Line 8, delete "FSTN" and insert -- PSTN --, therefor.